(12) United States Patent
Ferguson et al.

(10) Patent No.: US 10,210,408 B2
(45) Date of Patent: Feb. 19, 2019

(54) USE OF RELATIONSHIP BETWEEN ACTIVITIES OF DIFFERENT TRAFFIC SIGNALS IN A NETWORK TO IMPROVE TRAFFIC SIGNAL STATE ESTIMATION

(71) Applicant: Waymo LLC, Mountain View, CA (US)

(72) Inventors: David I. Ferguson, San Francisco, CA (US); Bradley Templeton, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/839,124

(22) Filed: Dec. 12, 2017

(65) Prior Publication Data
US 2018/0114077 A1    Apr. 26, 2018

Related U.S. Application Data

(63) Continuation of application No. 15/653,716, filed on Jul. 19, 2017, now Pat. No. 9,875,417, which is a
(Continued)

(51) Int. Cl.
| | |
|---|---|
| *G06K 9/00* | (2006.01) |
| *G08G 1/0962* | (2006.01) |
| *G08G 1/0967* | (2006.01) |
| *B60W 40/00* | (2006.01) |
| *G08G 1/00* | (2006.01) |

(52) U.S. Cl.
CPC ........ *G06K 9/00825* (2013.01); *B60W 40/00* (2013.01); *G08G 1/00* (2013.01); *G08G 1/09623* (2013.01); *G08G 1/09626* (2013.01); *G08G 1/096716* (2013.01); *G08G 1/096725* (2013.01); *G08G 1/096758* (2013.01); *G08G 1/096775* (2013.01); *G08G 1/096791* (2013.01)

(58) Field of Classification Search
None
See application file for complete search history.

(56) References Cited

U.S. PATENT DOCUMENTS

| | | | |
|---|---|---|---|
| 6,728,623 | B2 | 4/2004 | Takenaga et al. |
| 7,274,306 | B2 | 9/2007 | Publicover |

(Continued)

OTHER PUBLICATIONS

Demmel et al., "V2V/V21 Augmented Maps: State-of-the-Art and Contribution to Real-Time Crash Risk Assessment", Proceedings of 20th Canadian Multidisciplinary Road Safety Conference, Jun. 2010, pp. 1-14.
(Continued)

*Primary Examiner* — Todd M Melton
(74) *Attorney, Agent, or Firm* — McDonnell Boehnen Hulbert & Berghoff LLP

(57) ABSTRACT

Methods and devices for using a relationship between activities of different traffic signals in a network to improve traffic signal state estimation are disclosed. An example method includes determining that a vehicle is approaching an upcoming traffic signal. The method may further include determining a state of one or more traffic signals other than the upcoming traffic signal. Additionally, the method may also include determining an estimate of a state of the upcoming traffic signal based on a relationship between the state of the one or more traffic signals other than the upcoming traffic signal and the state of the upcoming traffic signal.

20 Claims, 8 Drawing Sheets

Related U.S. Application Data continuation of application No. 14/843,705, filed on Sep. 2, 2015, now Pat. No. 9,734,417, which is a continuation of application No. 13/622,418, filed on Sep. 19, 2012, now Pat. No. 9,158,980.

(56) References Cited

U.S. PATENT DOCUMENTS

| | | |
|---|---|---|
| 7,398,076 B2 | 7/2008 | Kubota et al. |
| 8,185,296 B2 | 5/2012 | Yokoyama et al. |
| 8,229,663 B2 | 7/2012 | Zeng et al. |
| 8,344,909 B2 | 1/2013 | Teffer et al. |
| 8,352,112 B2 | 1/2013 | Mudalige |
| 8,441,374 B2 | 5/2013 | Yokoyama et al. |
| 8,751,154 B2 | 6/2014 | Zhang et al. |
| 8,755,991 B2 | 6/2014 | Wynter et al. |
| 2006/0235967 A1 | 10/2006 | Fritz |
| 2011/0115646 A1 | 5/2011 | Matsumura |
| 2011/0182475 A1 | 7/2011 | Fairfield et al. |

OTHER PUBLICATIONS

Levinson et al., "Traffic Light Mapping, Localization, and State Detection for Autonomous Vehicles", 2011 IEEE International Conference on Robotics and Automation, May 2011, pp. 5784-5791.

USE OF RELATIONSHIP BETWEEN ACTIVITIES OF DIFFERENT TRAFFIC SIGNALS IN A NETWORK TO IMPROVE TRAFFIC SIGNAL STATE ESTIMATION

CROSS-REFERENCE TO RELATED APPLICATIONS

This application is a continuation of U.S. patent application Ser. No. 15/653,716 filed on Jul. 19, 2017, which is a continuation of U.S. patent application Ser. No. 14/843,705 filed on Sep. 2, 2015, which is a continuation of U.S. patent application Ser. No. 13/622,418 filed on Sep. 19, 2012, the entire contents of each of which are hereby incorporated by reference.

BACKGROUND

Some vehicles are configured to operate in an autonomous mode in which the vehicle navigates through an environment with little or no input from a driver. Such a vehicle may include one or more sensors that are configured to sense information about the environment. The vehicle may use the sensed information to navigate through the environment.

For example, if an output of the sensors is indicative that the vehicle is approaching an obstacle, the vehicle may navigate around the obstacle. Additionally, a vehicle may sense information about traffic signs and traffic signals. For example, traffic signs may provide regulatory information or warning information while traffic signals positioned at road intersections, pedestrian crossings, and other locations may be used to control competing flows of traffic.

SUMMARY

In one example aspect, a method is disclosed that includes determining, using a computing device, that a vehicle is approaching an upcoming traffic signal. The method may further include determining, using the computing device, a state of one or more traffic signals other than the upcoming traffic signal. Additionally, the method may also include determining, using the computing device, an estimate of a state of the upcoming traffic signal based on a relationship between the state of the one or more traffic signals other than the upcoming traffic signal and the state of the upcoming traffic signal.

In another example aspect, a non-transitory computer-readable medium is disclosed having stored therein instructions executable by a computing device to cause the computing device to perform functions. The functions may include determining that a vehicle is approaching an upcoming traffic signal. The functions may further include determining a state of one or more traffic signals other than the upcoming traffic signal. Additionally, the functions may also include determining an estimate of a state of the upcoming traffic signal based on a relationship between the state of the one or more traffic signals other than the upcoming traffic signal and the state of the upcoming traffic signal.

In yet another example aspect, a controller is disclosed. The controller may include at least one processor, a memory, and instructions stored in the memory and executable by the at least on processor to cause the controller to perform functions. The functions may include determining that a vehicle is approaching an upcoming traffic signal. The functions may further include determining a state of one or more traffic signals other than the upcoming traffic. Additionally, the functions may also include determining an estimate of a state of the upcoming traffic signal based on a relationship between the state of the one or more traffic signals other than the upcoming traffic signal and the state of the upcoming traffic signal.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
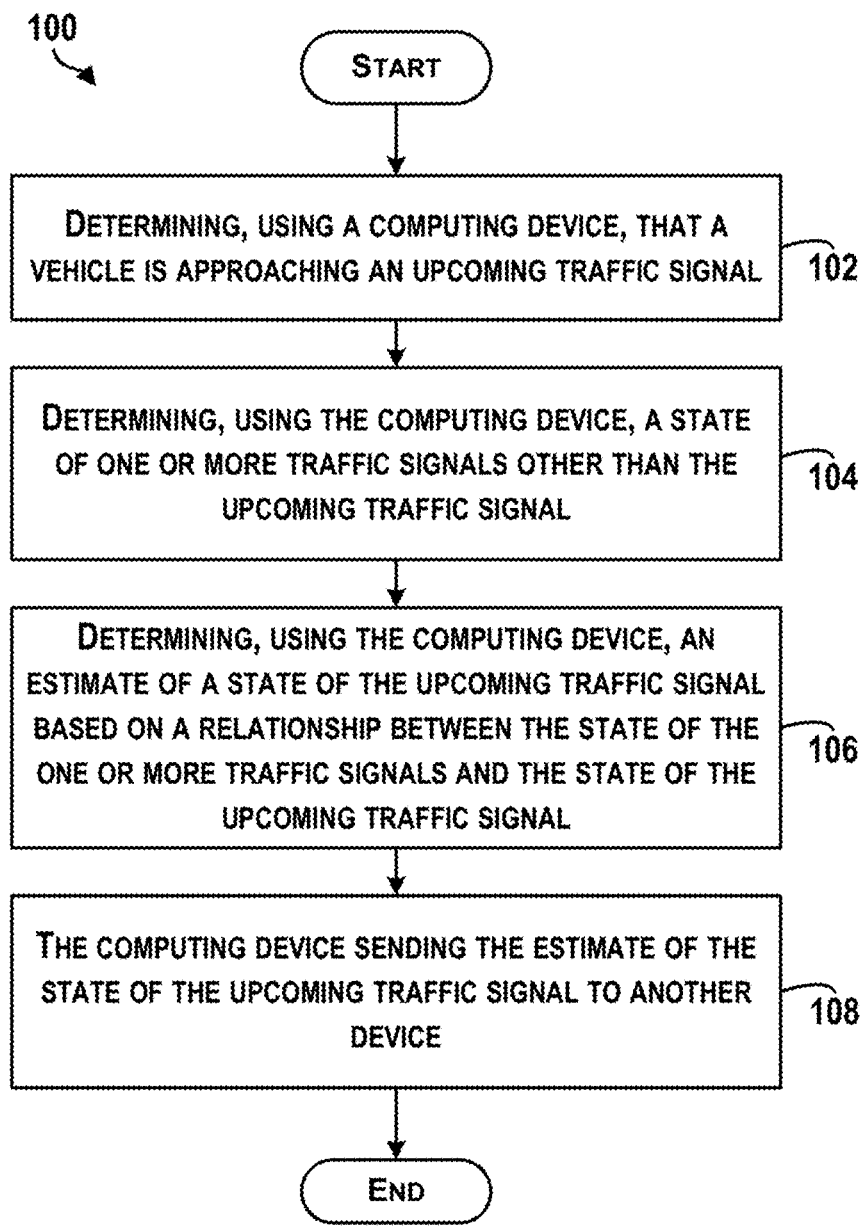
FIG. 1 is a block diagram of an example method of estimating a state of a traffic signal.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

A vehicle, such as a vehicle configured to operate autonomously, may be configured to determine a state of a traffic signal. For example, the vehicle may use one or more sensors such as a camera laser scanner and/or LIDAR to determine a state of a traffic signal. In some instances, estimating the state of an upcoming traffic signal (e.g., red, yellow, or green) may be challenging for a controller of a vehicle. Detection of a color of a traffic signal may be difficult because the color of the traffic signal may blend in with a background, a traffic signal may be swaying in the wind, or a traffic signal may have been temporarily relocated due to construction, for example. Therefore, incorporating as much additional information as possible about an estimate of the state of a traffic signal may be important to improve confidence in the estimate.

According to the described systems and methods, an estimate of a state of an upcoming traffic signal may be determined based on a relationship between the state of the upcoming traffic signal and states of one or more other traffic signals in the environment. For example, if a vehicle receives information about states of other traffic signals (e.g., traffic signals on side streets, traffic signals in the distance, or cross-traffic traffic signals) recently observed by the vehicle and/or other vehicles, a controller of the vehicle may use a known relationship between the states of the traffic signals and the upcoming traffic signal to provide an additional inference about the state of the upcoming traffic signal.

Although the vehicle is described as being configured to operate autonomously, the example is not meant to be limiting. In another instance, a computing device (e.g., a computing device that is on-board the vehicle or a computing device in a server) may be configured to estimate the state of the upcoming traffic signal and provide the estimate of the state of the upcoming traffic signal to another device, such as a driver assistance system or a navigation system. Subsequently, the estimate of the state of the upcoming traffic signal may be used by the another device to perform one or more functions. Additionally, although many of the examples are described with respect to an upcoming traffic signal for a vehicle, the described systems and methods may be applicable to estimating the state of any traffic signal in a road network. Various other example scenarios are also described hereinafter.

FIG. 1 is a block diagram of an example method 100 of estimating a state of a traffic signal. Method 100 shown in FIG. 1 presents an embodiment of a method that could be used with the vehicles described herein, for example, and may be performed by a vehicle or components of a vehicle, or more generally by a server or other computing device. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the block diagram shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

Figure 5:
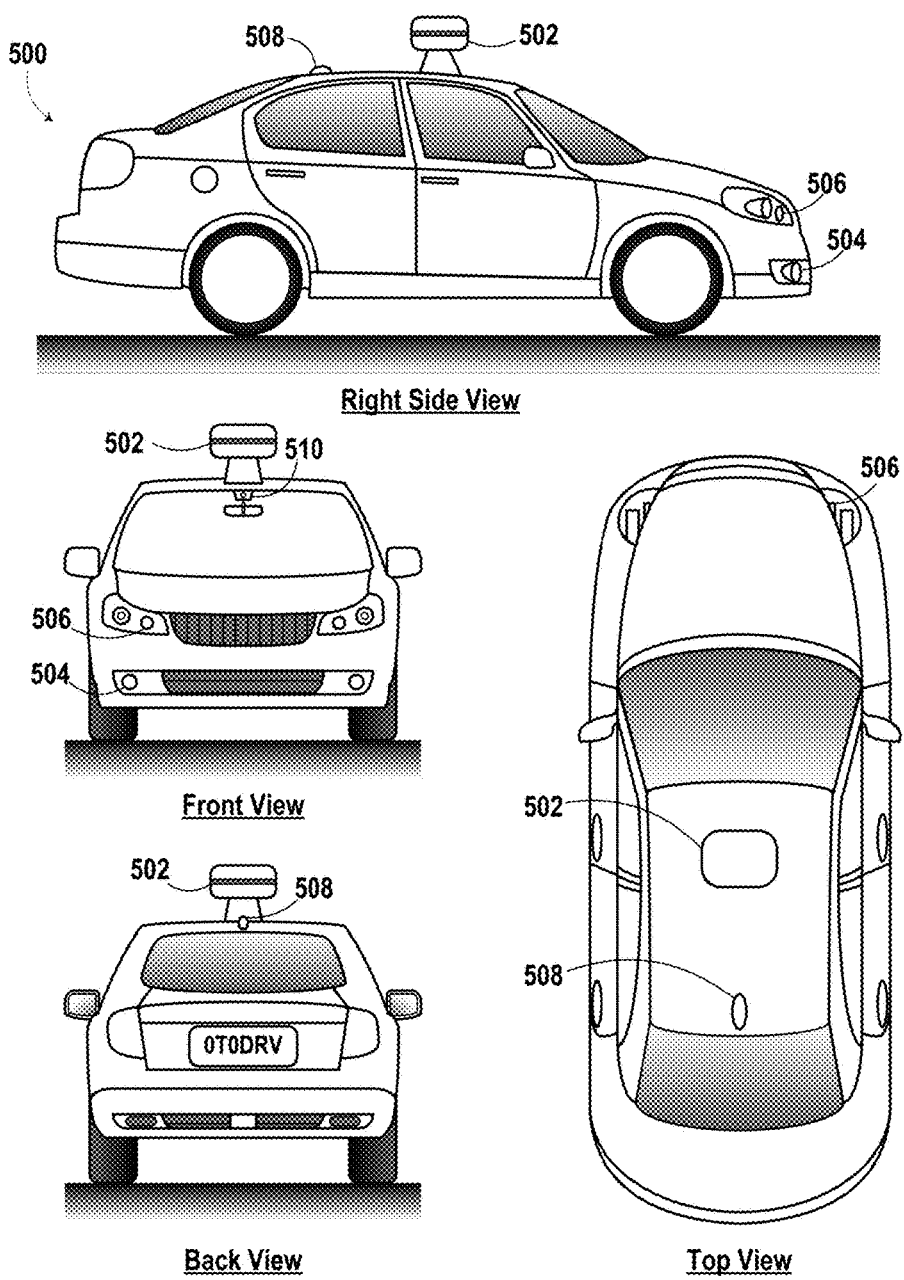
FIG. 5 illustrates an example vehicle, in accordance with an embodiment.
Figure 6:
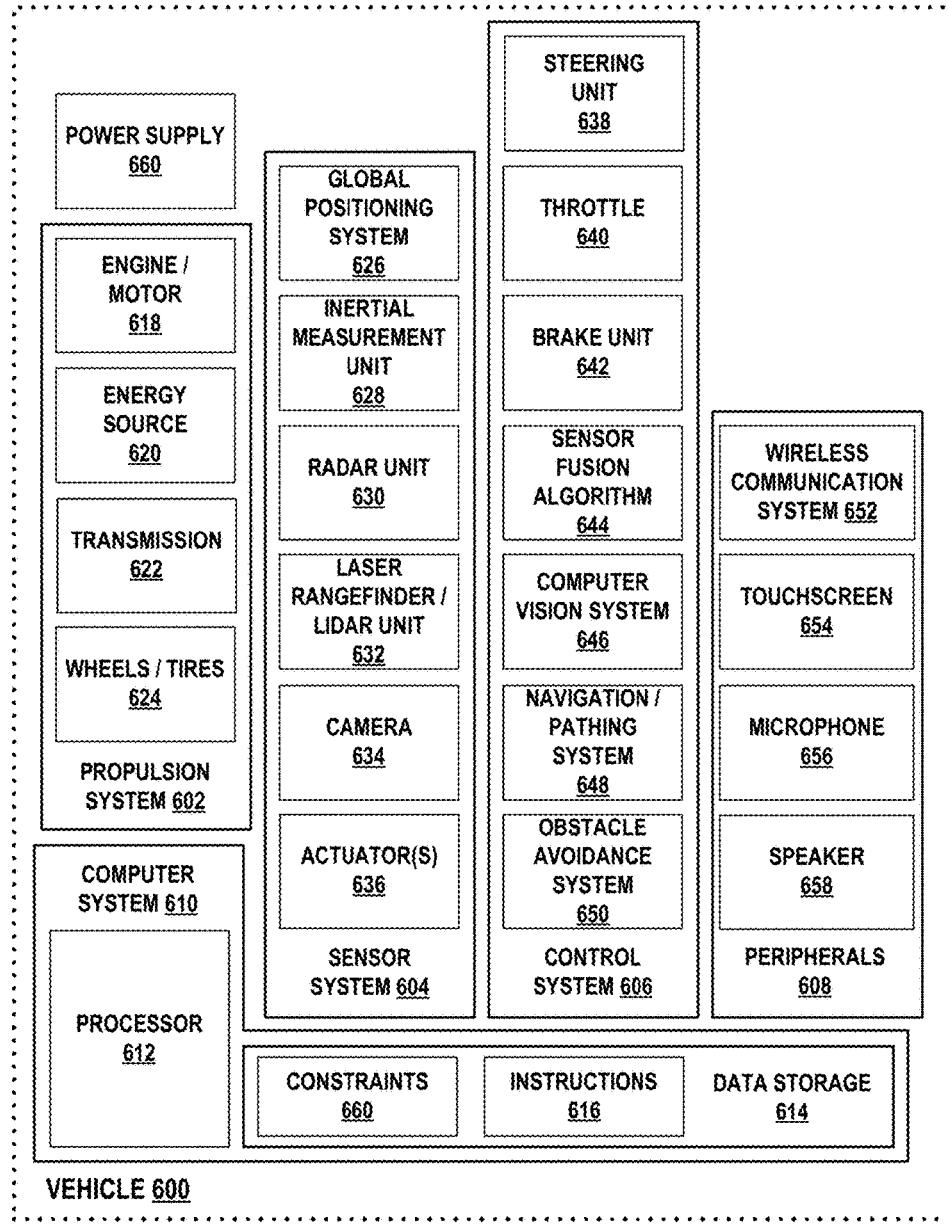
FIG. 6 is a simplified block diagram of an example vehicle, in accordance with an embodiment.

As shown, initially, at block 102, the method 100 includes determining, using a computing device, that a vehicle is approaching an upcoming traffic signal. In one example, the computing device may be configured to control the vehicle in an autonomous mode. The vehicle described with respect to FIGS. 5 and 6 is one such example of a vehicle that may be configured to operate autonomously. The vehicle may include a GPS receiver (or other geographic positioning component) to determine a geographic location and an accelerometer, gyroscope, or other acceleration device to determine a pitch, yaw, and roll (or changes thereto) relative to the direction of gravity. In one instance, a geographic location of the vehicle may be compared to a map of an environment that includes information about intersections of roads to determine a proximity of the vehicle to an intersection known to include a traffic signal.

In a further example, if the vehicle is approaching a traffic signal as indicated on a map of positions of traffic signals, one or more sensors of the vehicle may be used to scan a target area to determine a state of the traffic signal. The one or more sensors may include imaging and/or non-imaging components. For example, various types of cameras may be mounted in various configurations to the vehicle to capture an image of an upcoming area. In one instance, a camera may be positioned to face straight ahead and mounted behind or near a rear-view mirror. Additionally, a camera may capture a specific region of interest, such as a 2040× 1080 region, of a camera with a fixed lens with a 30 degree field of view. The camera may be calibrated to detect traffic signals at various distances to ensure a reasonable braking distance. In a further example, gain and shutter speeds of the camera may be set to avoid saturation of traffic signals during the day and/or night.

In another example, the one or more sensors may include a three-dimensional (3D) scanning device configured to determine distances to surfaces of objects in an upcoming area. In one instance, a structured light projection device and camera may be used to determine a three-dimensional point cloud describing the upcoming area. In another instance, a laser and/or radar device such as a LIDAR or laser rangefinder may scan the target area to determine distances to objects. In other instances, a stereo camera or time-of-flight camera may be used for range imaging.

Based on information from the one or more sensors, a traffic signal may be detected. In some instances, a pattern, template, shape, or signature that is expected for traffic signals may be identified. As an example, a traffic signal classifier may find a pattern of red, yellow, and green objects with appropriate size and aspect ratios within an image. Any example image processing techniques may be used to identify one or more portions of the image matching a known pattern. Template matching is one possible example.

In an instance, in which the 3D position of a traffic signal is known, a prediction of where a traffic signal should appear in an image may be used to determine the state of the traffic signal. For example, based on an estimate of a position of the vehicle with respect to the 3D position (e.g., using a GPS), a predicted position for the traffic signal can be projected into the image from of a camera of the vehicle. In one example, the predicted position may be an axis-aligned bounding box which selects a portion of the image. However, other example regions or shapes are also possible. The portion of the image may then be analyzed to determine the state of the traffic signal.

For example, the predicted position may be processed to identify brightly colored red or green objects, and the predicted position may change as the position of the vehicle approaches the traffic signal. In some instances, if a traffic signal is detected, a state of the traffic signal may be determined. Determining the state of the traffic signal may include determining which object in a pattern of red, yellow, and green objects of an image of a traffic signal is illuminated. In one instance, an image processing method may be used to determine a distinction between brightness of the red, yellow, and green objects to determine an object with the highest brightness. The object with the highest brightness may be assumed to be on, for example. In an instance in which multiple traffic signals are detected, a state of a traffic signal corresponding to a traffic lane of the vehicle may be determined. Additionally, in some instances, one or more color sensors may be used to determine the state of a traffic signal. For example, using a gray (clear) sensor and a color-filtered sensor (e.g., a red filtered sensor) one can tell the difference between red and green objects. A red object will appear bright in a gray and red-filtered image while a green object will appear bright in a gray filtered image but much dimmer in the red-filtered image. It will be understood that the specific structure of red, yellow, and green lights is merely an example. Traffic signals may have varied and sometimes complex geometries and these additional geometries may also be detected.

In an example in which a three-dimensional point cloud is determined, an object in the 3D point cloud having a shape that is expected for traffic signals may be detected. For example, 3D point cloud based object recognition systems may be used to identify features describing interest points within the 3D point cloud. The features may subsequently be compared to features expected for a 3D model of one or more types of traffic signals to recognize groups of interest points as objects within the 3D point cloud that are traffic signals. Given a recognized traffic signal, color information (e.g., an image) associated with the location of the 3D object may be analyzed to determine the state of the traffic signal.

Although the state of the traffic signal may be determined in some instances, there may be some degree of noise/uncertainty in the measurements and estimate of the state of the traffic signal. For example, a sensor used to determine the state of the traffic signal may include an amount of noise. Additionally, in some instances, a location and/or orientation of the traffic signal may change, impacting a clarity of the traffic signal in an image. As an example, a traffic signal may swing when suspended from a cable, or a traffic signal may be moved to a temporary location due to road construction. In another instance, the brightness or clarity of an image may be affected based on a position of the sun at various times of the day or night. In still another example, an image of a traffic signal may be noisy in various weather conditions such as fog, snow, rain, etc. Also, a tree or another vehicle may obstruct or partially obstruct a portion of a traffic signal in an image.

In some instances, information about the states of other traffic signals may be determined to aide in the determination of the state of the upcoming traffic signal or increase a confidence in an estimate of the state of the upcoming traffic signal. Although the method 100 is described with respect to an upcoming traffic signal, it is also contemplated that method 100 may be used to determine the state of any target traffic signal in a road network. For example, a navigation or route planning system may wish to know the state of any traffic signal in a network.

At block 104, the method 100 includes determining, using the computing device, a state of one or more traffic signals other than the upcoming traffic signal. For instance, the one or more traffic signals may be other traffic signals in the environment. In some examples, the traffic signals may be traffic signals that are within a distance threshold of the upcoming threshold (e.g., within 2-3 blocks, within a mile, etc.) for which states have recently been observed.

As an example, the vehicle may obtain sensor data from sensors of the vehicle, and the state of the other traffic signals may be determined based on the sensor data. The vehicle may be able to determine the state of a cross-traffic traffic signal at an intersection in some cases. In other cases, the vehicle may be able to determine the state of a traffic signal which is the next traffic signal on a road (e.g., the traffic signal at the next intersection in the direction of travel) or recall the state of a traffic signal from a previous intersection from a memory.

As another example, the vehicle may receive information about the state of other traffic signals from one or more other vehicles. Other vehicles may observe a state of a traffic signal and send information to the vehicle directly (e.g., wirelessly), via a communication network, or via a server in a network. As still another example, fixed sensors in the environment may be configured to determine the state of other traffic signals and send the state of the other traffic signals to the vehicle, either directly or via any type of network. For instance, the fixed sensors may include imaging devices configured to observe the state of a traffic signal.

In other examples, the state of one or more traffic signals other than the traffic signal may be received from transportation or road authorities. For instance, a transportation or road authority that manages a traffic control system for a road network may provide information about the states of one or more traffic signals that can be accessed in real-time. In some instances, because the information from the transportation or road authorities may be provided over a high latency channel, an estimate of the state of the traffic signal may account for the latency, and optionally make predictions based on the latency. For example, information indicating that a given traffic signal operating on a thirty second cycle changed to red four seconds ago may be received over a channel with a five to ten second latency. Accordingly, the estimate of the state of the traffic signal may be red. However, if the received information for the same channel indicated that the given traffic signal changed to red twenty-two seconds ago, the estimate of the state of the traffic signal may be green or red with associated probabilities based on average tendencies of the latency.

In another example, information received from transit authorities may provide an additional clue about the state of a traffic signal. For instance, information about the arrival or schedules of light rail vehicles, trains, cable-cars or other transit vehicles may be received. In cases in which transit vehicles intersect roads, the arrival of a transit vehicle at an intersection with a road may coincide with a state(s) of one or more traffic signals governing the flow of traffic on the road or adjacent roads.

In still other examples, one or more traffic signals may be configured to transmit their state and timing information via radio communication protocols. In a scenario in which the upcoming traffic signal is not configured to transmit state and timing information, information received from other traffic signals that do transmit state and timing information may be received.

At block 106, the method 100 includes determining, using the computing device, an estimate of a state of the upcoming traffic signal based on a relationship between the state of the one or more traffic signals and the state of the upcoming traffic signal. In some cases, a conditional relationship between the state of the upcoming traffic signal and one or more other traffic signals may be known. As a simple example, it may be known that if the cross-traffic traffic signal at an intersection is green, the state of the upcoming traffic signal is red.

In another instance, the upcoming traffic signal may have a relationship with a traffic signal on an adjacent parallel road such that if the adjacent traffic signal is green, the upcoming traffic signal will be green, optionally with probability "P". Similarly, a relationship between a past traffic signal on a road and the upcoming traffic signal may exist such that the upcoming traffic signal turns green "x" seconds after the previous traffic signal turns green. In some examples, the method 100 might also include determining an additional estimate of when the state of the upcoming traffic signal will change. For example, if another vehicle observed and recorded a time when the past traffic signal turned green, the computing device may be able to estimate that the upcoming traffic signal will turn green at a time that is "x" seconds from the recorded time.

By constructing a conditional map of traffic signals and their states based on observations of states of traffic signals or information about traffic signal patterns received from a transportation or road authority, and observing states of other traffic signals in real-time, the vehicle or another device may be provided with useful additional information to improve determination of the state of the upcoming traffic signal. There are many ways to create such a network map including collecting data from vehicles and post-processing the data, acquiring data from transportation/road authorities, and/or setting up static sensors in the environment to acquire data. In further examples, the state of an upcoming traffic signal might also be determined based on a conditional relationship between states of other traffic signals as well as one or more other factors such as time of day, day of the week, or traffic conditions. There are also many ways of taking the network information and extracting useful pieces of information for subsequent state estimation. Conditioning the state of each traffic signal on the state of all other traffic signals is one approach. Another approach might involve conditioning the state of each traffic signal based on a small fraction of other traffic signals (e.g., those in close proximity or within a distance threshold of a given upcoming traffic signal).

At block 108, the method 100 includes the computing device sending the estimate of the state of the upcoming traffic signal to another device. As on example, the estimate of the state of the upcoming traffic signal may be sent to a controller that is configured to control the vehicle in an autonomous mode based on the estimate of the state of the upcoming traffic signal. In some examples, the vehicle may use the estimate of the state of the upcoming traffic signal as a check on a determined state of the upcoming traffic signal. As an example, if the estimate of the traffic signal is green, and the state of the traffic signal as determined by the vehicle is green, the vehicle may proceed through the traffic intersection and maintain its speed. Alternatively, if the state of the upcoming traffic signal as determined by the vehicle is green, and the estimate of the state of the upcoming traffic signal is red, the vehicle may proceed with caution, or seek additional information regarding the state of the traffic signal from any number of other sources.

For instance, the vehicle may gather information (e.g., determined in real-time or previously from the one or more sensors or additional sensors) to confirm the state of the traffic signal. The information may indicate behavior of other vehicles, such as vehicles traveling in the same or opposite direction, or cross-traffic. In another example, the vehicle may determine information such as changes in speed or acceleration, or distances to vehicles in front of and/or behind the vehicle. A vehicle in front of the vehicle that is braking may be indicative of a traffic signal that is yellow or red. The information may also indicate behavior of pedestrians in a crosswalk. For example, a pedestrian walking in a crosswalk that is perpendicular to a direction of travel of the vehicle may be indicative of a traffic signal that is red. In some instances, the vehicle may move to an adjusted position and determine additional information. For instance, the vehicle may move to an adjacent lane that is also a path in the same direction through the traffic intersection and determine information about a state of the traffic signal or a state of a different traffic signal. In other instances, the vehicle may gather information from pedestrian crosswalk signs which may display or flash a message (e.g., "walk" or "don't walk") or include a countdown timer. Based on the orientation of and an observed state of the crosswalk sign and an intended route of the vehicle through an intersection, an additional inference regarding the state of the traffic intersection or traffic signal may be determined. For example, seeing a "walk" message in a direction that agrees with a direction of the vehicle may offer a clue, but not a certainty due to pedestrian's having the right-of-way in some instances, that a traffic signal is green.

In other examples, the vehicle may request information from a passenger or driver of the vehicle regarding the state of a traffic intersection or a traffic signal. Based on information received from the passenger or driver, the behavior of the vehicle may be modified. In other examples, the vehicle may tap into a network of the traffic signal or multiple traffic signals to determine information about the state of the traffic signal. For example, the vehicle may receive information about the state of a traffic signal from a wireless transmitter or transceiver located at the traffic signal, at a wireless tower, on a satellite, on another vehicle, etc. Thus, the example method 100 may enable controlling a vehicle based on an estimate of a state of an upcoming traffic signal that is determined based on states of other traffic signals.

As another example, the computing device may provide the estimate of the state of the upcoming traffic signal to a driver assistance system. For instance, the driver assistance system may include an intelligent speed adaptation system that is configured to adjust the speed of the vehicle based on an estimate of the state of the upcoming traffic signal and optionally an estimate of when the state of the upcoming traffic signal will change. In another instance, the driver assistance system may include a navigation system that is configured to plan a route for a driver of the vehicle based on an estimate of the state of the upcoming traffic signal. As an example, the navigation system may select a different route based on the estimate of the state of the upcoming traffic signal. In still another instance, the driver assistance system may be configured to alert the driver of the vehicle via an audible, visual, or other type of alert regarding the state of the upcoming traffic signal. Other example driver assistance systems are also contemplated.

One or more blocks 102-108 of the method 100 may be performed by a computing device in a server or by a computing device of the vehicle. For example, a computing device in a server may determine that the vehicle is approaching the upcoming traffic signal, determine the state of one or more traffic signals other than the upcoming traffic signal, and determine the estimate of the state of the upcoming traffic signal. In one instance, the computing device may access a conditional map having relationships between states of traffic signals, determine the state estimate based on the relationships, and provide the estimate to the computing device. Additionally, the computing device may provide instructions for controlling the vehicle in the autonomous mode to the vehicle.

A number of example scenarios and implementations of the method 100 are described below in connection with FIGS. 2A-4. For purposes of illustration, multiple example implementations are described. It is to be understood, however, that the example implementations are illustrative only and are not meant to limiting. Other example implementations are possible as well.

Figure 2A:
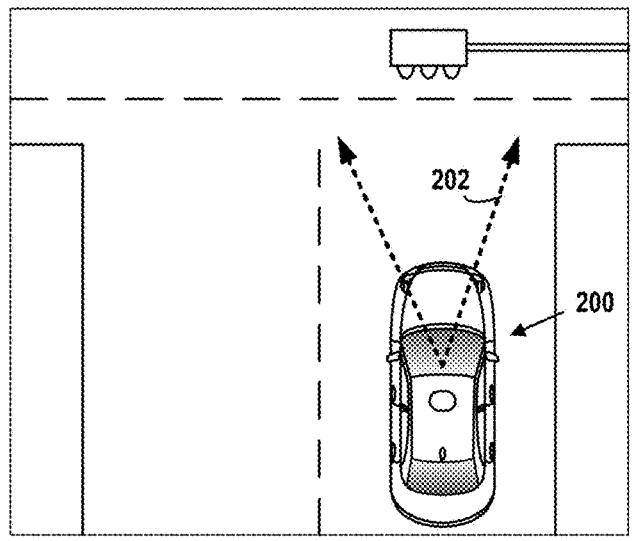
FIGS. 2A-2C are example conceptual illustrations of determining a state of a traffic signal.
Figure 2B:
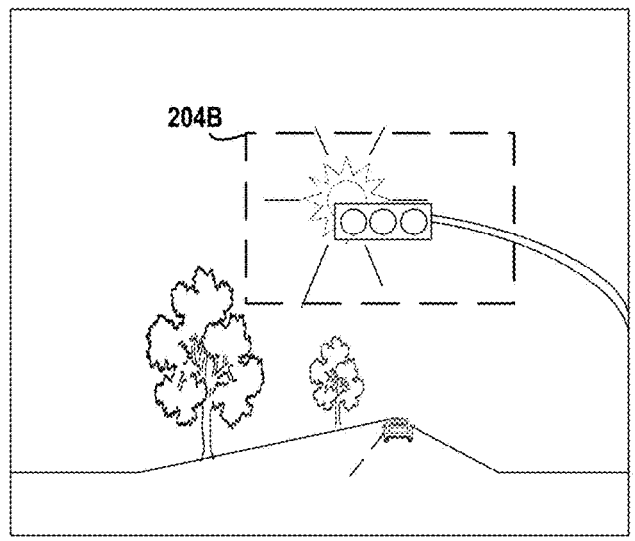
Figure 2C:
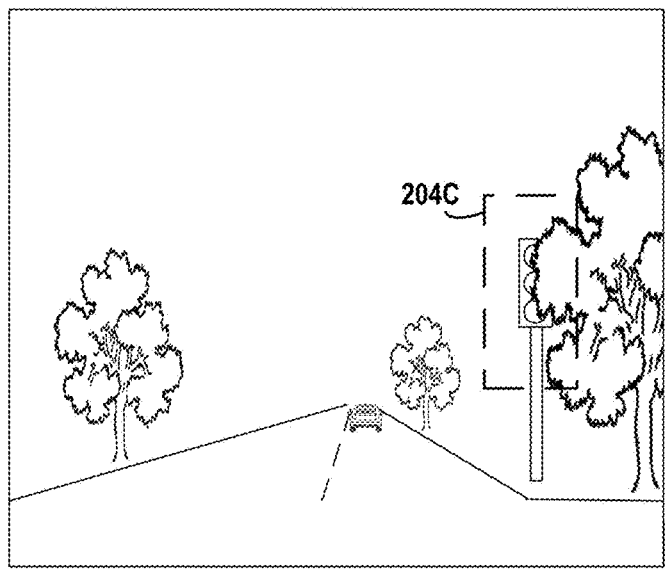

FIGS. 2A-2C are example conceptual illustrations of determining a state of a traffic signal. For example, FIGS. 2A-2C illustrate a top view of a vehicle 200 and two perspective views from a position of the vehicle 200. In some examples, the vehicle 200 may scan a target area to determine information associated with a state of a traffic signal. For example, information within a field of view 202 of the vehicle 200 may be obtained. In one instance, an imaging component and/or radar component of the vehicle may be used to obtain information within the field of view 202. The imaging component and radar component may be mounted behind or adjacent to a rear-view mirror, such that in a scenario in which the vehicle 200 includes a driver and/or passenger(s), the imaging component or radar component minimally obstructs a field of view of the deriver and/or passenger(s). In another scenario, the imaging component and/or the radar component may be mounted on the top of the vehicle 200.

As shown in FIG. 2B, in one example, the vehicle 200 may obtain an image of an area 204B. The image may include 2D and/or 3D information. In some examples, the area 204B may include one or more traffic signals and may optionally be predetermined based on known locations of traffic signals and a location and orientation of the vehicle 200.

In some examples, the clarity of an image of the area 204B may be affected by lighting conditions. As shown in FIG. 2B, the position of the sun may be located behind a position of a traffic signal at some times of the day. This may lead to an uncertainty that is higher than uncertainties for other times of the day when the clarity of the image is not affected by the position of the sun.

As shown in FIG. 2C, an image of an area 204C may also be obstructed by physical objects. For example, a tree limb may obstruct a portion of a traffic signal in an image of the area 204C. In one example, a 3D image of the area 204C may reveal objects at multiple distances from the position of the vehicle in a region for which a traffic signal is expected. For example, a first distance may be determined to a point in the area 204C that is closer to the vehicle than a group of points in the area 204C that are in the shape of a portion of a traffic signal. This may be indicative of an object that is obstructing a view of the traffic signal. In some instances, a high uncertainty may be determined for instances in which an object is obstructing a view of the traffic signal.

Figure 3:
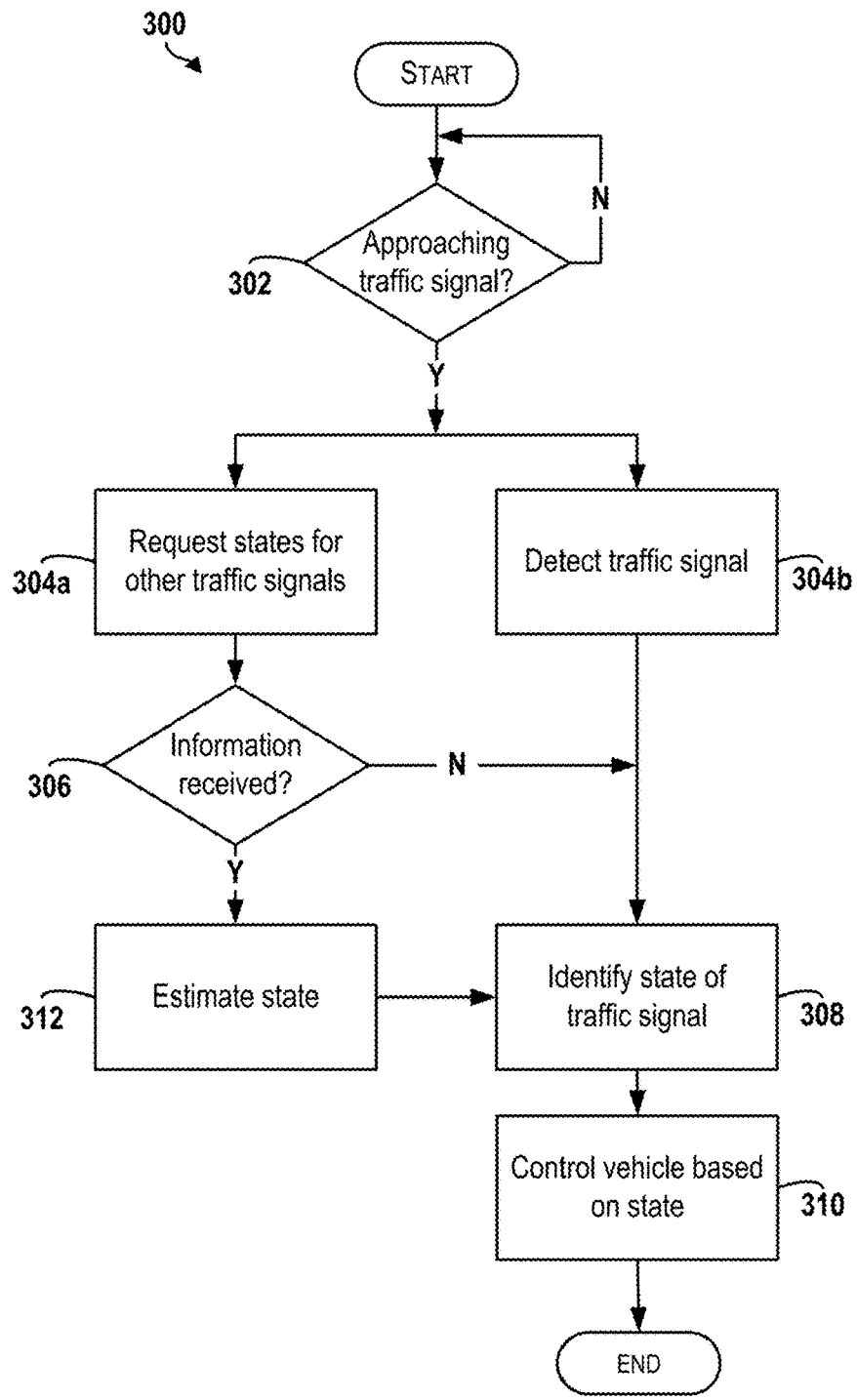
FIG. 3 is an example flow chart for controlling a vehicle.

In some example scenarios, if a view of a traffic signal is obstructed, or information associated with the state of the traffic signal is noisy, an estimate of the state of the traffic intersection may be determined based on states of other traffic signals. FIG. 3 is an example flow chart 300 for controlling a vehicle.

As shown in FIG. 3, at block 302, a determination may be made, by the vehicle and/or a server, whether the vehicle is approaching a traffic signal. For instance, the determination may be made based on a location of the vehicle in relation to a known map having locations of traffic signals. If the vehicle is not approaching a traffic signal, the determination may again be made at a later instance in time. If the vehicle is approaching the traffic signal, at block 304a, a server may request information for states of other traffic signals. The states may include recently observed states of other traffic signals (e.g., states observed within the past second, five seconds, etc.) that are provided to the server by vehicles, fixed sensors, transportation or road authorities, or other sources. Additionally, in parallel, the vehicle may attempt to detect the traffic signal at block 304b. For instance, the vehicle may capture an image of a target area and process the image.

The server may also determine whether other states of traffic signals have recently been observed at block 306. If information about the other states is not received, the vehicle may proceed to identify the state of the traffic signal, at block 308, based on information from the sensors of the vehicle. Subsequently, based on the state of the traffic signal, the vehicle may be controlled in the autonomous mode at block 310. If at block 306, information about other states of traffic signals is received, the server may, at block 312, determine an estimate of the state of the traffic signal that the vehicle is approaching. The estimate may be determined based on a relationship between the states of the other traffic signals and the state of the traffic signal. The estimate may be provided to the vehicle, such that at block 308, the vehicle may identify the state of the traffic signal based on any detected information from the sensors of the vehicle as well as the estimate determined at block 312.

Figure 4:
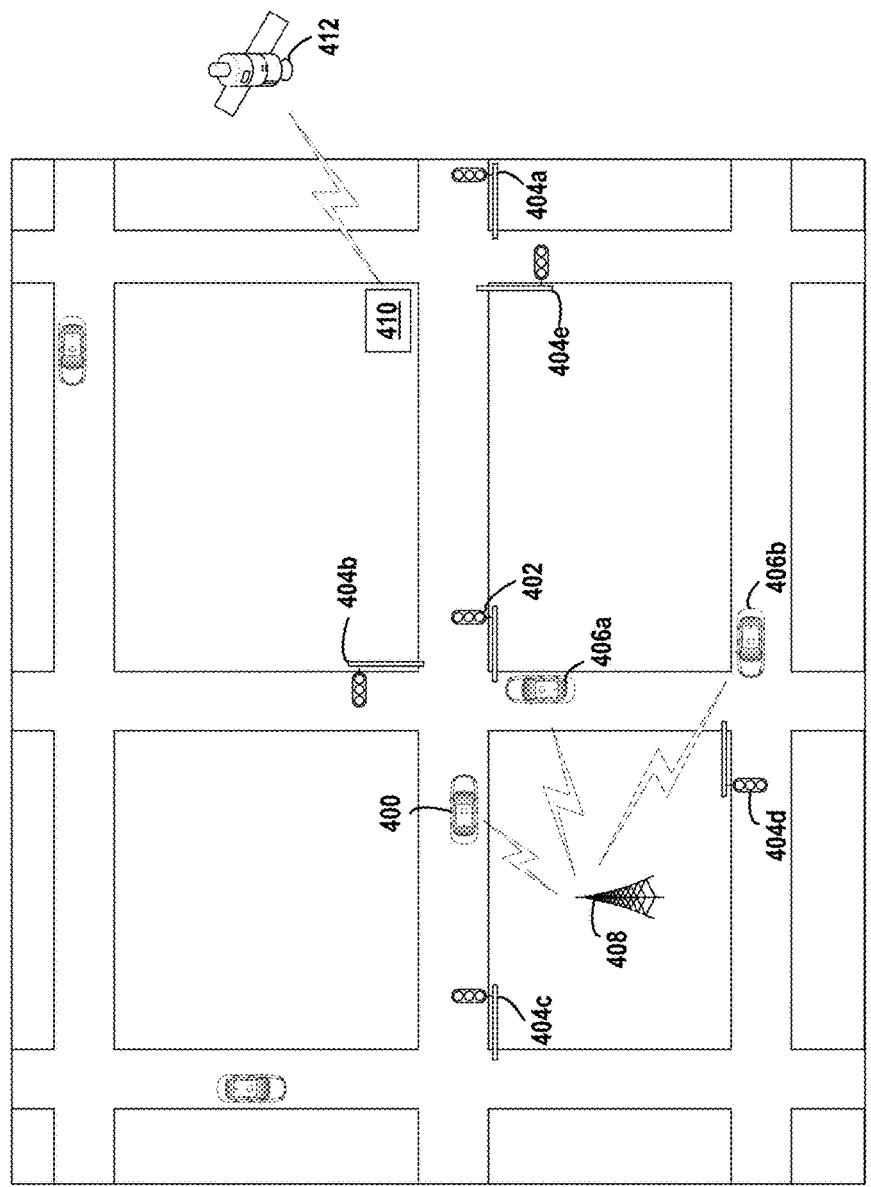
FIG. 4 is an example conceptual illustration of determining states of traffic signals in a road network to estimate a state of an upcoming traffic signal.

FIG. 4 is an example conceptual illustration of determining states of traffic signals in a road network to estimate a state of an upcoming traffic signal. As shown in FIG. 4, a primary vehicle 400 may be approaching an upcoming traffic signal 402. To improve the estimate of a state of a traffic signal, information about observed states of any of secondary traffic signals 404a-e in the environment may be utilized.

In one example, primary vehicle 400 may be able to observe the state of secondary traffic signal 404a and/or 404b while approaching upcoming traffic signal 402. In an instance in which primary vehicle 400 observes the state of traffic signal 402a, information about a relationship between the state of secondary traffic signal 404a and the state of upcoming traffic signal 402 may be used to estimate the state of upcoming traffic signal 402. For instance, secondary traffic signal 404a and upcoming traffic signal 402 may turn green at the same time. In an instance in which primary vehicle 400 observes the state of secondary traffic signal 404b, an estimate of the state of the upcoming traffic signal 402 may be determined based on a relationship between the states of upcoming traffic signal 402 and secondary traffic signal 404b. For instance, the upcoming traffic signal 402 may be red while the secondary traffic signal 404b is green or yellow, and may turn green one second after secondary traffic signal 404b turns red.

In another example, the primary vehicle may have recently observed the state of secondary traffic signal 404c and rely on a relationship between the states of upcoming traffic signal 402 and the secondary traffic signal 404c to determine an estimate of the state of the upcoming traffic signal 402. For instance, the relationship between the states of secondary traffic signal 404c and upcoming traffic signal 402 may be that the upcoming traffic signal 402 turns green four seconds after the secondary traffic signal 404c turns green. If the primary vehicle observes and records the time when the secondary traffic signal 404c turns green, the primary vehicle 400 may be able to estimate that the upcoming traffic signal is green at an instance in time that is five seconds after the time when the secondary traffic signal 404c turned green.

Additionally, secondary vehicles 406a and 406b may observe the state of secondary traffic signals 404b and/or 404d respectively, and transmit the state information to the primary vehicle 400 or a server in a network via the communication tower 408. In still another example, a fixed sensor 410 may observe the states of secondary traffic signals 404a and/or 404e and transmit the information to the primary vehicle 400 or a server in a network via satellite 412. Thus, the primary vehicle 400 and/or a server may receive information about observed states of other traffic signals in a network that may be used to improve an estimate of a state of the upcoming traffic signal 402.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

FIG. 5 illustrates an example vehicle 500, in accordance with an embodiment. In particular, FIG. 5 shows a Right Side View, Front View, Back View, and Top View of the vehicle 500. Although vehicle 500 is illustrated in FIG. 5 as a car, other embodiments are possible. For instance, the vehicle 500 could represent a truck, a van, a semi-trailer truck, a motorcycle, a golf cart, an off-road vehicle, or a farm vehicle, among other examples. As shown, the vehicle 500 includes a first sensor unit 502, a second sensor unit 504, a third sensor unit 506, a wireless communication system 508, and a camera 510.

Each of the first, second, and third sensor units 502-506 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 502 are shown to be mounted in particular locations on the vehicle 500, in some embodiments the sensor unit 502 may be mounted elsewhere on the vehicle 500, either inside or outside the vehicle 500. Further, while only three sensor units are shown, in some embodiments more or fewer sensor units may be included in the vehicle 500.

In some embodiments, one or more of the first, second, and third sensor units 502-506 may include one or more movable mounts on which the sensors may be movably mounted. The movable mount may include, for example, a rotating platform. Sensors mounted on the rotating platform could be rotated so that the sensors may obtain information from each direction around the vehicle 500. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 502-506 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 508 may be any system configured to wirelessly couple to one or more other vehicles, sensors, or other entities, either directly or via a communication network. To this end, the wireless communication system 508 may include an antenna and a chipset for communicating with the other vehicles, sensors, or other entities either directly or via a communication network. The chipset or wireless communication system 508 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 508 may take other forms as well.

While the wireless communication system 508 is shown positioned on a roof of the vehicle 500, in other embodiments the wireless communication system 508 could be located, fully or in part, elsewhere.

The camera 510 may be any camera (e.g., a still camera, a video camera, etc.) configured to capture images of the environment in which the vehicle 500 is located. To this end, the camera 510 may be configured to detect visible light, or may be configured to detect light from other portions of the spectrum, such as infrared or ultraviolet light. Other types of cameras are possible as well. The camera 510 may be a two-dimensional detector, or may have a three-dimensional spatial range. In some embodiments, the camera 510 may be, for example, a range detector configured to generate a two-dimensional image indicating a distance from the camera 510 to a number of points in the environment. To this end, the camera 510 may use one or more range detecting techniques. For example, the camera 510 may use a structured light technique in which the vehicle 500 illuminates an object in the environment with a predetermined light pattern, such as a grid or checkerboard pattern and uses the camera 510 to detect a reflection of the predetermined light pattern off the object. Based on distortions in the reflected light pattern, the vehicle 500 may determine the distance to the points on the object. The predetermined light pattern may comprise infrared light, or light of another wavelength. As another example, the camera 510 may use a laser scanning technique in which the vehicle 500 emits a laser and scans across a number of points on an object in the environment. While scanning the object, the vehicle 500 uses the camera 510 to detect a reflection of the laser off the object for each point. Based on a length of time it takes the laser to reflect off the object at each point, the vehicle 500 may determine the distance to the points on the object. As yet another example, the camera 510 may use a time-of-flight technique in which the vehicle 500 emits a light pulse and uses the camera 510 to detect a reflection of the light pulse off an object at a number of points on the object. In particular, the camera 510 may include a number of pixels, and each pixel may detect the reflection of the light pulse from a point on the object. Based on a length of time it takes the light pulse to reflect off the object at each point, the vehicle 500 may determine the distance to the points on the object. The light pulse may be a laser pulse. Other range detecting techniques are possible as well, including stereo triangulation, sheet-of-light triangulation, interferometry, and coded aperture techniques, among others. The camera 510 may take other forms as well.

In some embodiments, the camera 510 may include a movable mount and/or an actuator, as described above, that are configured to adjust the position and/or orientation of the camera 510 by moving the camera 510 and/or the movable mount.

While the camera 510 is shown to be mounted inside a front windshield of the vehicle 500, in other embodiments the camera 510 may be mounted elsewhere on the vehicle 500, either inside or outside the vehicle 500.

The vehicle 500 may include one or more other components in addition to or instead of those shown.

FIG. 6 is a simplified block diagram of an example vehicle 600, in accordance with an embodiment. The vehicle 600 may, for example, be similar to the vehicle 500 described above in connection with FIG. 5. The vehicle 600 may take other forms as well.

As shown, the vehicle 600 includes a propulsion system 602, a sensor system 604, a control system 606, peripherals 608, and a computer system 610 including a processor 612, data storage 614, and instructions 616. In other embodiments, the vehicle 600 may include more, fewer, or different systems, and each system may include more, fewer, or different components. Additionally, the systems and components shown may be combined or divided in any number of ways.

The propulsion system 602 may be configured to provide powered motion for the vehicle 600. As shown, the propulsion system 602 includes an engine/motor 618, an energy source 620, a transmission 622, and wheels/tires 624.

The engine/motor 618 may be or include any combination of an internal combustion engine, an electric motor, a steam engine, and a Stirling engine. Other motors and engines are possible as well. In some embodiments, the propulsion system 602 could include multiple types of engines and/or motors. For instance, a gas-electric hybrid car could include a gasoline engine and an electric motor. Other examples are possible.

The energy source 620 may be a source of energy that powers the engine/motor 618 in full or in part. That is, the engine/motor 618 may be configured to convert the energy source 620 into mechanical energy. Examples of energy sources 620 include gasoline, diesel, propane, other compressed gas-based fuels, ethanol, solar panels, batteries, and other sources of electrical power. The energy source(s) 620 could additionally or alternatively include any combination of fuel tanks, batteries, capacitors, and/or flywheels. In some embodiments, the energy source 620 may provide energy for other systems of the vehicle 600 as well.

The transmission 622 may be configured to transmit mechanical power from the engine/motor 618 to the wheels/tires 624. To this end, the transmission 622 may include a gearbox, clutch, differential, drive shafts, and/or other elements. In embodiments where the transmission 622 includes drive shafts, the drive shafts could include one or more axles that are configured to be coupled to the wheels/tires 624.

The wheels/tires 624 of vehicle 600 could be configured in various formats, including a unicycle, bicycle/motorcycle, tricycle, or car/truck four-wheel format. Other wheel/tire formats are possible as well, such as those including six or more wheels. In any case, the wheels/tires 624 of vehicle 624 may be configured to rotate differentially with respect to other wheels/tires 624. In some embodiments, the wheels/tires 624 may include at least one wheel that is fixedly attached to the transmission 622 and at least one tire coupled to a rim of the wheel that could make contact with the driving surface. The wheels/tires 624 may include any combination of metal and rubber, or combination of other materials.

The propulsion system 602 may additionally or alternatively include components other than those shown.

The sensor system 604 may include a number of sensors configured to sense information about an environment in which the vehicle 600 is located, as well as one or more actuators 636 configured to modify a position and/or orientation of the sensors. As shown, the sensors of the sensor system include a Global Positioning System (GPS) 626, an inertial measurement unit (IMU) 628, a RADAR unit 630, a laser rangefinder and/or LIDAR unit 632, and a camera 634. The sensor system 604 may include additional sensors as well, including, for example, sensors that monitor internal systems of the vehicle 600 (e.g., an $O_2$ monitor, a fuel gauge, an engine oil temperature, etc.). Other sensors are possible as well.

The GPS 626 may be any sensor configured to estimate a geographic location of the vehicle 600. To this end, the GPS 626 may include a transceiver configured to estimate a position of the vehicle 600 with respect to the Earth. The GPS 626 may take other forms as well.

The IMU 628 may be any combination of sensors configured to sense position and orientation changes of the vehicle 600 based on inertial acceleration. In some embodiments, the combination of sensors may include, for example, accelerometers and gyroscopes. Other combinations of sensors are possible as well.

The RADAR 630 unit may be any sensor configured to sense objects in the environment in which the vehicle 600 is located using radio signals. In some embodiments, in addition to sensing the objects, the RADAR unit 630 may additionally be configured to sense the speed and/or heading of the objects.

Similarly, the laser rangefinder or LIDAR unit 632 may be any sensor configured to sense objects in the environment in which the vehicle 600 is located using lasers. In particular, the laser rangefinder or LIDAR unit 632 may include a laser source and/or laser scanner configured to emit a laser and a detector configured to detect reflections of the laser. The laser rangefinder or LIDAR 632 may be configured to operate in a coherent (e.g., using heterodyne detection) or an incoherent detection mode.

The camera 634 may be any camera (e.g., a still camera, a video camera, etc.) configured to capture images of the environment in which the vehicle 600 is located. To this end, the camera may take any of the forms described above.

The sensor system 604 may additionally or alternatively include components other than those shown.

The control system 606 may be configured to control operation of the vehicle 600 and its components. To this end, the control system 606 may include a steering unit 638, a throttle 640, a brake unit 642, a sensor fusion algorithm 644, a computer vision system 646, a navigation or pathing system 648, and an obstacle avoidance system 650.

The steering unit 638 may be any combination of mechanisms configured to adjust the heading of vehicle 600.

The throttle 640 may be any combination of mechanisms configured to control the operating speed of the engine/motor 618 and, in turn, the speed of the vehicle 600.

The brake unit 642 may be any combination of mechanisms configured to decelerate the vehicle 600. For example, the brake unit 642 may use friction to slow the wheels/tires 624. As another example, the brake unit 642 may convert the kinetic energy of the wheels/tires 624 to electric current. The brake unit 642 may take other forms as well.

The sensor fusion algorithm 644 may be an algorithm (or a computer program product storing an algorithm) configured to accept data from the sensor system 604 as an input. The data may include, for example, data representing information sensed at the sensors of the sensor system 604. The sensor fusion algorithm 644 may include, for example, a Kalman filter, a Bayesian network, or another algorithm. The sensor fusion algorithm 644 may further be configured to provide various assessments based on the data from the sensor system 604, including, for example, evaluations of individual objects and/or features in the environment in which the vehicle 600 is located, evaluations of particular situations, and/or evaluations of possible impacts based on particular situations. Other assessments are possible as well.

The computer vision system 646 may be any system configured to process and analyze images captured by the camera 634 in order to identify objects and/or features in the environment in which the vehicle 600 is located, including, for example, traffic signals and obstacles. To this end, the computer vision system 646 may use an object recognition algorithm, a Structure from Motion (SFM) algorithm, video tracking, or other computer vision techniques. In some embodiments, the computer vision system 646 may additionally be configured to map the environment, track objects, estimate the speed of objects, etc.

The navigation and pathing system 648 may be any system configured to determine a driving path for the vehicle 600. The navigation and pathing system 648 may additionally be configured to update the driving path dynamically while the vehicle 600 is in operation. In some embodiments, the navigation and pathing system 648 may be configured to incorporate data from the sensor fusion algorithm 644, the GPS 626, and one or more predetermined maps so as to determine the driving path for vehicle 100.

The obstacle avoidance system 650 may be any system configured to identify, evaluate, and avoid or otherwise negotiate obstacles in the environment in which the vehicle 600 is located.

The control system 606 may additionally or alternatively include components other than those shown.

Peripherals 608 may be configured to allow the vehicle 600 to interact with external sensors, other vehicles, and/or a user. To this end, the peripherals 608 may include, for example, a wireless communication system 652, a touchscreen 654, a microphone 656, and/or a speaker 658.

The wireless communication system 652 may take any of the forms described above.

The touchscreen 654 may be used by a user to input commands to the vehicle 600. To this end, the touchscreen 654 may be configured to sense at least one of a position and a movement of a user's finger via capacitive sensing, resistance sensing, or a surface acoustic wave process, among other possibilities. The touchscreen 654 may be capable of sensing finger movement in a direction parallel or planar to the touchscreen surface, in a direction normal to the touchscreen surface, or both, and may also be capable of sensing a level of pressure applied to the touchscreen surface. The touchscreen 654 may be formed of one or more translucent or transparent insulating layers and one or more translucent or transparent conducting layers. The touchscreen 654 may take other forms as well.

The microphone 656 may be configured to receive audio (e.g., a voice command or other audio input) from a user of the vehicle 600. Similarly, the speakers 658 may be configured to output audio to the user of the vehicle 600.

The peripherals 608 may additionally or alternatively include components other than those shown.

The computer system 610 may be configured to transmit data to and receive data from one or more of the propulsion system 602, the sensor system 604, the control system 606, and the peripherals 608. To this end, the computer system 610 may be communicatively linked to one or more of the propulsion system 602, the sensor system 604, the control system 606, and the peripherals 608 by a system bus, network, and/or other connection mechanism (not shown).

The computer system 610 may be further configured to interact with and control one or more components of the propulsion system 602, the sensor system 604, the control system 606, and/or the peripherals 608. For example, the computer system 610 may be configured to control operation of the transmission 622 to improve fuel efficiency. As another example, the computer system 610 may be configured to cause the camera 634 to capture images of the environment. As yet another example, the computer system 610 may be configured to store and execute instructions corresponding to the sensor fusion algorithm 644. As still another example, the computer system 610 may be configured to store and execute instructions for displaying a display on the touchscreen 654. Other examples are possible as well.

As shown, the computer system 610 includes the processor 612 and data storage 614. The processor 612 may comprise one or more general-purpose processors and/or one or more special-purpose processors. To the extent the processor 612 includes more than one processor, such processors could work separately or in combination. Data storage 614, in turn, may comprise one or more volatile and/or one or more non-volatile storage components, such as optical, magnetic, and/or organic storage, and data storage 614 may be integrated in whole or in part with the processor 612.

In some embodiments, data storage 614 may contain instructions 616 (e.g., program logic) executable by the processor 612 to execute various vehicle functions, including those described above in connection with FIG. 1. Further, data storage 614 may contain constraints 660 for the vehicle 600, which may take any of the forms described above. Data storage 614 may contain additional instructions as well, including instructions to transmit data to, receive data from, interact with, and/or control one or more of the propulsion system 602, the sensor system 604, the control system 606, and the peripherals 608.

The computer system 602 may additionally or alternatively include components other than those shown.

As shown, the vehicle 600 further includes a power supply 610, which may be configured to provide power to some or all of the components of the vehicle 600. To this end, the power supply 610 may include, for example, a rechargeable lithium-ion or lead-acid battery. In some embodiments, one or more banks of batteries could be configured to provide electrical power. Other power supply materials and configurations are possible as well. In some embodiments, the power supply 610 and energy source 620 may be implemented together, as in some all-electric cars.

In some embodiments, one or more of the propulsion system 602, the sensor system 604, the control system 606, and the peripherals 608 could be configured to work in an interconnected fashion with other components within and/or outside their respective systems.

Further, the vehicle 600 may include one or more elements in addition to or instead of those shown. For example, the vehicle 600 may include one or more additional interfaces and/or power supplies. Other additional components are possible as well. In such embodiments, data storage 614 may further include instructions executable by the processor 612 to control and/or communicate with the additional components.

Still further, while each of the components and systems are shown to be integrated in the vehicle 600, in some embodiments, one or more components or systems may be removably mounted on or otherwise connected (mechanically or electrically) to the vehicle 600 using wired or wireless connections.

The vehicle 600 may take other forms as well.

Figure 7:
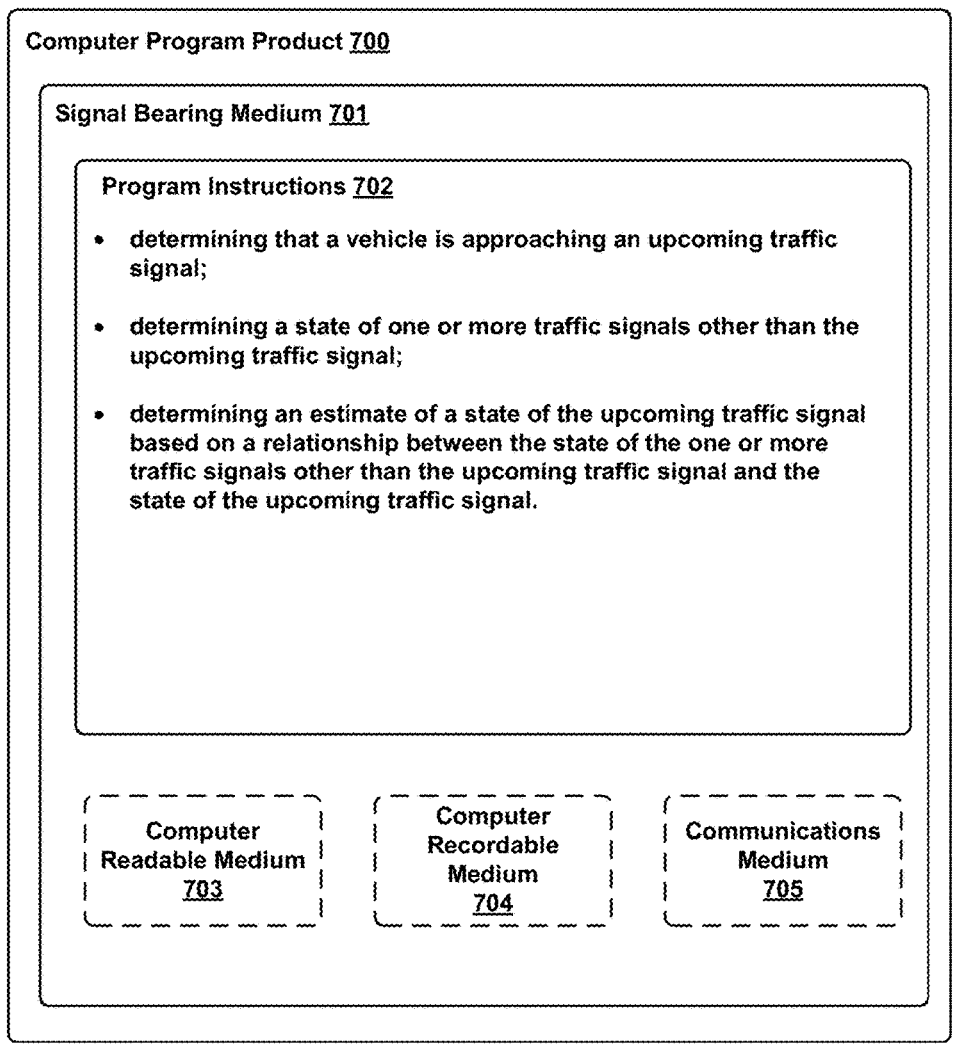
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors, may provide functionality or portions of the functionality described above with respect to FIGS. 1-6.

In some embodiments, the signal bearing medium 702 may encompass a computer-readable medium 706, such as, but not limited to, a hard disk drive, a Compact Disc (CD), a Digital Video Disk (DVD), a digital tape, memory, etc. Further, in some embodiments the signal bearing medium 702 may encompass a computer recordable medium 707, such as, but not limited to, memory, read/write (R/W) CDs, R/W DVDs, etc. Still further, in some embodiments the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing system such as the computing system 610 of FIG. 6 may be configured to provide various operations, functions, or actions in response to the programming instructions 704 being conveyed to the computing system 610 by one or more of the computer readable medium 706, the computer recordable medium 707, and/or the communications medium 710.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for controlling a vehicle, the method comprising:
   determining, using a computing device, a first estimate of a state of a detected traffic signal;
   receiving, by the computing device, a state of a traffic signal other than the detected traffic signal;
   determining, using the computing device, a second estimate of the state of the detected traffic signal based at least on a relationship between the state of the traffic signal other than the detected traffic signal and the state of the detected traffic signal;
   determining a control command based on a relationship between the first estimate and the second estimate; and
   providing instructions for controlling motion of the vehicle in accordance with the determined control command.

2. The method of claim 1, wherein determining the control command for the vehicle comprises outputting a command to maintain a current velocity based on the first estimate of the state of the detected traffic signal being green and the second estimate of the state of the detected traffic signal being green.

3. The method of claim 1, wherein determining the control command for the vehicle comprises outputting a command to proceed through an intersection governed by the detected traffic signal based on the first estimate of the state of the detected traffic signal being green and the second estimate of the state of the detected traffic signal being green.

4. The method of claim 1, wherein determining the control command for the vehicle comprises outputting a command to obtain additional information regarding the state of the detected traffic signal based on the first estimate of the state of the detected traffic signal being different from the second estimate of the state of the detected traffic signal.

5. The method of claim 4, wherein the command to obtain additional information regarding the state of the detected traffic signal comprises an instruction to gather information indicative of behavior of other vehicles.

6. The method of claim 4, wherein the command to obtain additional information regarding the state of the detected traffic signal comprises an instruction to gather information indicative of activity in a pedestrian crosswalk.

7. The method of claim 4, wherein the command to obtain additional information regarding the state of the detected traffic signal comprises an instruction to determine a state of a pedestrian crosswalk sign.

8. The method of claim 4, wherein the command to obtain additional information regarding the state of the detected traffic signal comprises an instruction to request information from an occupant of the vehicle.

9. The method of claim 1, wherein controlling motion of the vehicle in accordance with the determined control command comprises sending the determined control command to another device.

10. The method of claim 1, wherein receiving the state of the traffic signal other than the detected traffic signal comprises receiving the state of the traffic signal other than the detected traffic signal from another vehicle.

11. The method of claim 1, wherein receiving the state of the traffic signal other than the detected traffic signal comprises wirelessly receiving the state of the traffic signal other than the detected traffic signal from the traffic signal other than the detected traffic signal.

12. The method of claim 1, wherein receiving the state of the traffic signal other than the detected traffic signal comprises receiving the state of the traffic signal other than the detected traffic signal from a fixed sensor in an environment of the vehicle.

13. The method of claim 1, wherein determining the first estimate of the state of the detected traffic signal comprises obtaining an image of the detected traffic signal.

14. The method of claim 1, further comprising:
detecting an uncertainty in the first estimate of the state of the detected traffic signal; and
in response to detecting the uncertainty in the first estimate of the state of the detected traffic signal, requesting the state of the traffic signal other than the traffic signal.

15. The method of claim 1, wherein the traffic signal other than the detected traffic signal is located within a distance threshold of the detected traffic signal.

16. The method of claim 1, wherein the detected traffic signal is an upcoming traffic signal that the vehicle is approaching.

17. A controller comprising:
at least one processor;
a memory; and
instructions stored in the memory and executable by the at least one processor to cause the controller to perform functions comprising:
determining, using a computing device, a first estimate of a state of a detected traffic signal,
receiving, by the computing device, a state of a traffic signal other than the detected traffic signal,
determining a second estimate of the state of the detected traffic signal based at least on a relationship between the state of the traffic signal other than the detected traffic signal and the state of the detected traffic signal,
determining a control command based on a relationship between the first estimate and the second estimate, and
controlling motion of a vehicle in accordance with the determined control command.

18. The controller of claim 17, wherein determining the control command for the vehicle comprises outputting a command to proceed through an intersection governed by the detected traffic signal based on the first estimate of the state of the detected traffic signal being green and the second estimate of the state of the detected traffic signal being green.

19. The controller of claim 17, wherein determining the control command for the vehicle comprises outputting a command to obtain additional information regarding the state of the detected traffic signal based on the first estimate of the state of the detected traffic signal being different from the second estimate of the state of the detected traffic signal.

20. A method for controlling a vehicle, the method comprising:
determining, using a computing device, a first estimate of a state of a detected traffic signal;
receiving, by the computing device, a state of a traffic signal other than the detected traffic signal;
determining, using the computing device, a second estimate of the state of the detected traffic signal based at least on a relationship between the state of the traffic signal other than the detected traffic signal and the state of the detected traffic signal; and
using, by the computing device, the second estimate of the state of the detected traffic signal as a check on the first estimate of the state of the detected traffic signal.

* * * * *